(12) United States Patent
Nakamura et al.

(10) Patent No.: US 9,432,581 B2
(45) Date of Patent: Aug. 30, 2016

(54) INFORMATION PROCESSING DEVICE AND RECORDING MEDIUM FOR FACE RECOGNITION

(71) Applicant: SONY CORPORATION, Tokyo (JP)

(72) Inventors: Takatoshi Nakamura, Kanagawa (JP); Yoichiro Sako, Tokyo (JP); Akira Tange, Tokyo (JP); Kazuyuki Sakoda, Chiba (JP); Kohei Asada, Kanagawa (JP); Yuki Koga, Tokyo (JP); Tomoya Onuma, Shizuoka (JP); Yasunori Kamada, Kanagawa (JP); Takayasu Kon, Tokyo (JP); Kazunori Hayashi, Tokyo (JP); Hiroyuki Hanaya, Kanagawa (JP); Mitsuru Takehara, Tokyo (JP); Kazuhiro Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 151 days.

(21) Appl. No.: 14/090,141

(22) Filed: Nov. 26, 2013

(65) Prior Publication Data

US 2014/0176764 A1    Jun. 26, 2014

(30) Foreign Application Priority Data

Dec. 21, 2012   (JP) .................................. 2012-279279

(51) Int. Cl.
*H04N 5/76* (2006.01)
*H04N 5/232* (2006.01)
*G06K 9/00* (2006.01)

(52) U.S. Cl.
CPC ........ *H04N 5/23293* (2013.01); *G06K 9/00275* (2013.01); *G06K 9/00308* (2013.01); *H04N 5/23219* (2013.01)

(58) Field of Classification Search
CPC .......... G06K 9/00268; G06K 9/00308; H04N 5/23219
USPC ........................................................ 348/231.99
See application file for complete search history.

(56) References Cited

U.S. PATENT DOCUMENTS

| | | | | |
|---|---|---|---|---|
| 8,041,076 | B1 * | 10/2011 | Bourdev | 382/103 |
| 8,059,164 | B2 * | 11/2011 | Kim et al. | 348/222.1 |
| 8,270,764 | B1 * | 9/2012 | Agarwala et al. | 382/284 |
| 2004/0223649 | A1 * | 11/2004 | Zacks et al. | 382/218 |
| 2005/0031196 | A1 * | 2/2005 | Moghaddam | G06T 17/00 382/154 |
| 2005/0129324 | A1 * | 6/2005 | Lemke | 382/254 |
| 2006/0061598 | A1 * | 3/2006 | Mino et al. | 345/629 |

(Continued)

FOREIGN PATENT DOCUMENTS

JP    2008-198062 A    8/2008

*Primary Examiner* — Usman Khan
(74) *Attorney, Agent, or Firm* — Chip Law Group

(57) ABSTRACT

There is provided an information processing device including a recognition unit that recognizes a face area from a captured image, a storage controller that causes a storage unit to store face recognition information indicating a face area recognized by the recognition unit, and a display controller that superimposes onto a display unit a display indicating, as a face area candidate in a current captured image captured by an image capture unit according to an external instruction, an area that is among areas corresponding to a first face area indicated by face recognition information from another captured image stored in the storage unit, but is not included in a second face area recognized by the recognition unit from the current captured image, distinguishably from a display indicating the second face area.

14 Claims, 12 Drawing Sheets

(56) References Cited

U.S. PATENT DOCUMENTS

2008/0239092 A1* 10/2008 Sugino et al. ............. 348/222.1
2010/0066840 A1* 3/2010 Asukai et al. ............. 348/207.1
2010/0079491 A1* 4/2010 Nonaka ......................... 345/630
2011/0200259 A1* 8/2011 Lindskog et al. ............ 382/201

* cited by examiner

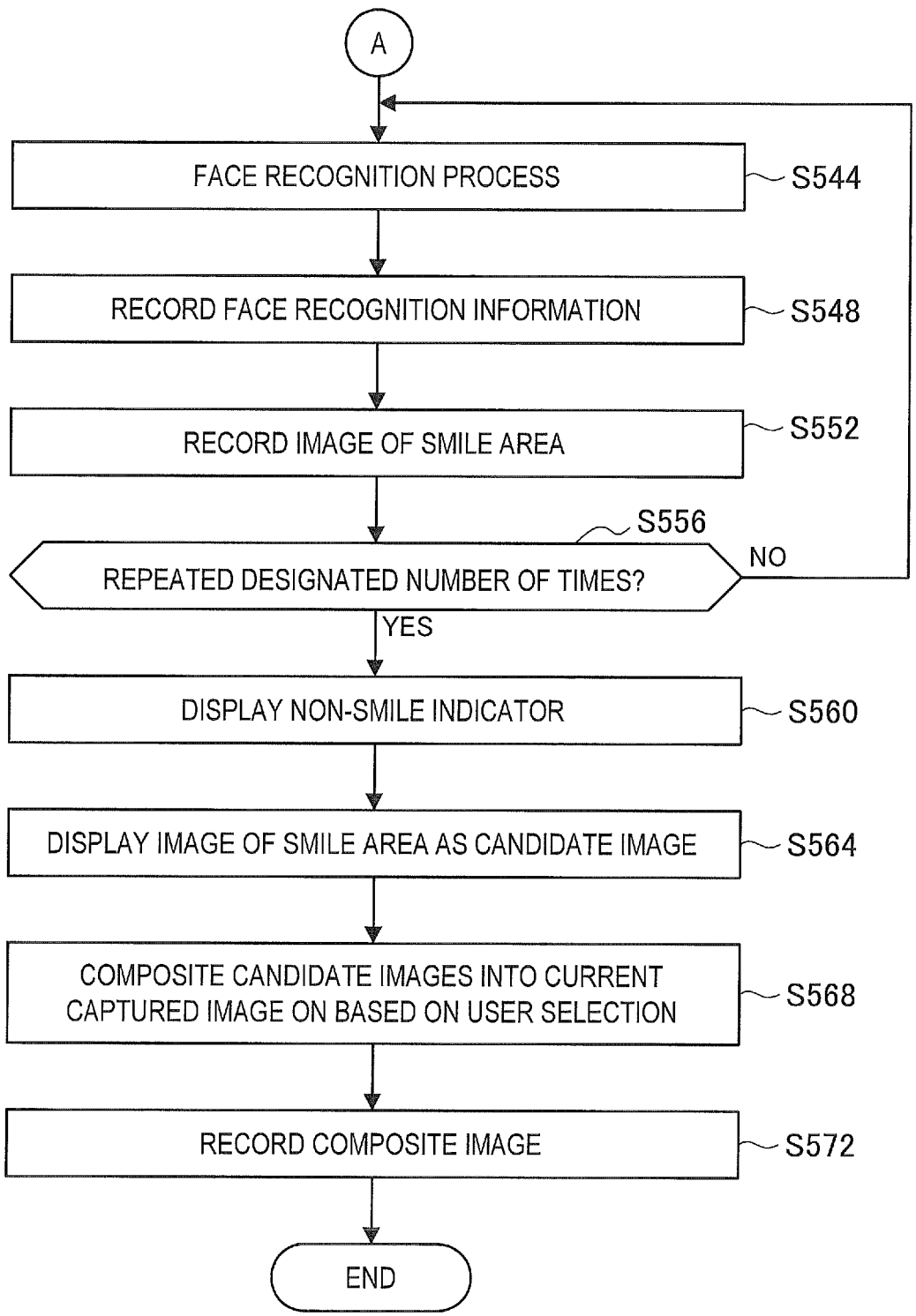

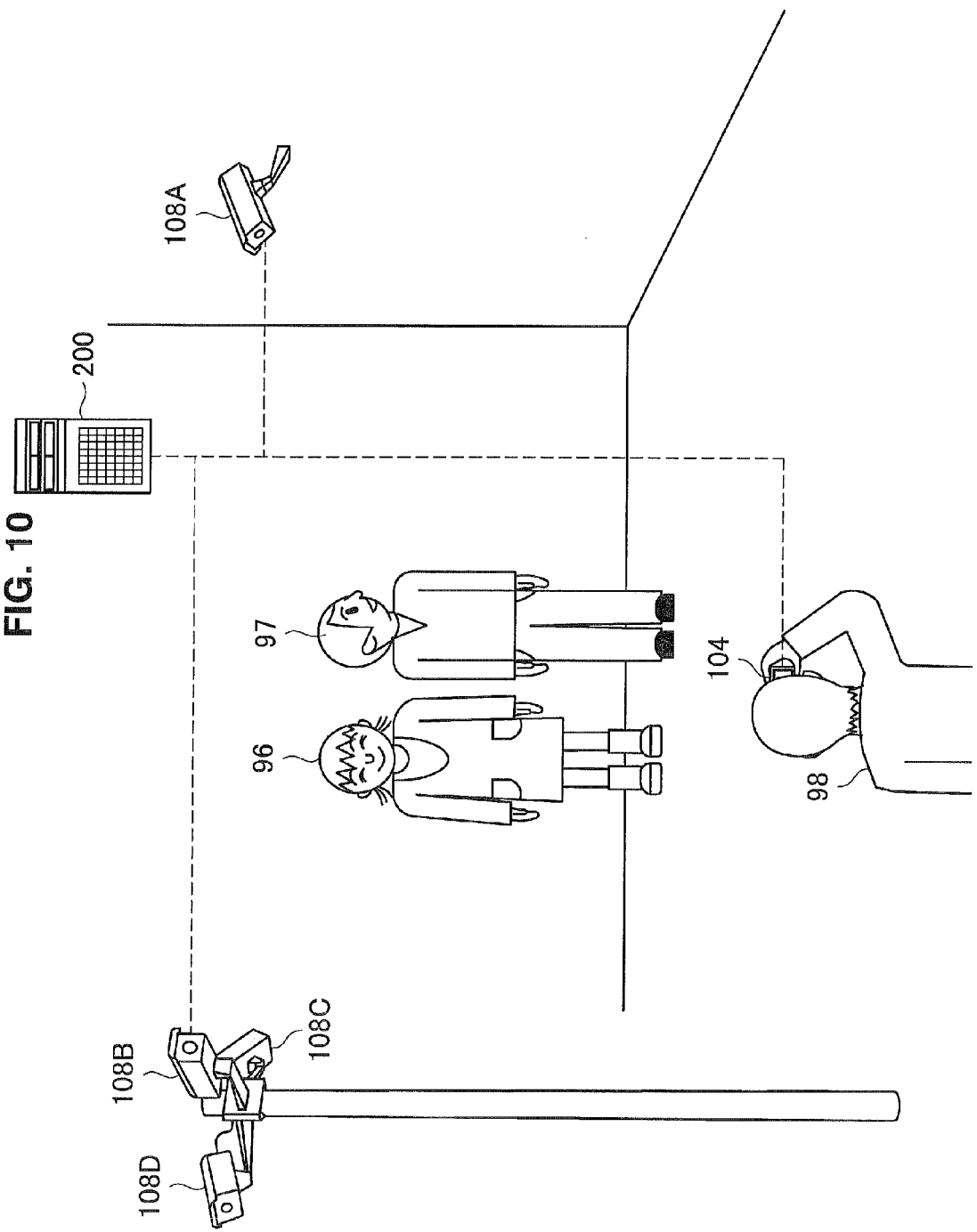

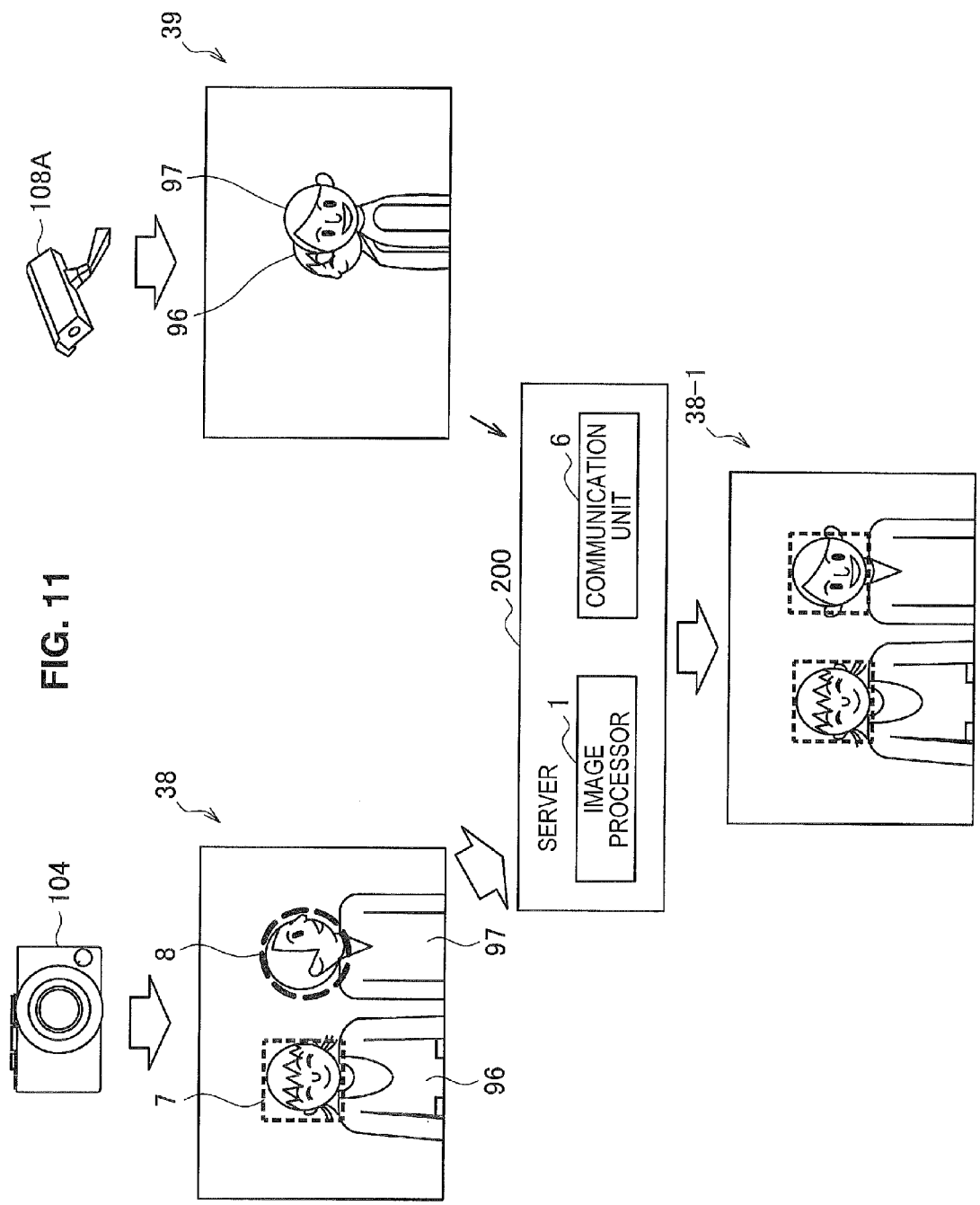

INFORMATION PROCESSING DEVICE AND RECORDING MEDIUM FOR FACE RECOGNITION

CROSS REFERENCE TO RELATED APPLICATION(S)

This application claims the benefit of Japanese Priority Patent Application JP 2012-279279 filed Dec. 21, 2012, the entire contents of which are incorporated herein by reference.

BACKGROUND

The present disclosure relates to an information processing device and a recording medium.

Generally, when photographing multiple people, such as in a group photo, it is desirable to capture an image in which as many people as possible have a happy expression. For this reason, there is being developed technology that reports that everyone is smiling as a shutter timing by conducting smile detection or blink detection, for example, and an image capture device that, after image capturing, corrects a face area without a happy expression with another image.

For example, Japanese Unexamined Patent Application Publication No. 2008-198062 below discloses technology that takes a face area which, although recognized as a face area from a captured image, is not smiling or is looking away, and substitutes in a face area from another image that is smiling and looking forward.

SUMMARY

However, the technology disclosed in Japanese Unexamined Patent Application Publication No. 2008-198062 above only processes areas recognized as faces, and does not perform any processing on areas not recognized as faces, such as faces looking sideways.

Consequently, in the present disclosure, there is proposed a new and improved information processing device and a recording medium capable of reports a face area not recognized as a face with image capture alone, on the basis of face recognition information from another image.

According to an embodiment of the present disclosure, there is provided an information processing device including a recognition unit that recognizes a face area from a captured image, a storage controller that causes a storage unit to store face recognition information indicating a face area recognized by the recognition unit, and a display controller that superimposes onto a display unit a display indicating, as a face area candidate in a current captured image captured by an image capture unit according to an external instruction, an area that is among areas corresponding to a first face area indicated by face recognition information from another captured image stored in the storage unit, but is not included in a second face area recognized by the recognition unit from the current captured image, distinguishably from a display indicating the second face area.

According to an embodiment of the present disclosure, there is provided a non-transitory computer-readable recording medium having a program recorded thereon for causing a computer to execute recognizing a face area from a captured image, causing a storage unit to store face recognition information indicating a recognized face area, and superimposing onto a display unit a display that indicates, as a face area candidate in a current captured image captured by an image capture unit according to an external instruction, an area that is among areas corresponding to a first face area indicated by face recognition information from another captured image stored in the storage unit, but is not included in a second face area recognized from the current captured image, distinguishably from a display indicating the second face area.

According to one or more of embodiments of the present disclosure as described above, it is possible to report a face area not recognized as a face with image capture alone, on the basis of face recognition information from another image.

BRIEF DESCRIPTION OF THE DRAWINGS

FIG. 9B is a flowchart illustrating operations of an image processor according to modification 3;

FIG. 10 is an explanatory diagram illustrating an overview of an image processor according to the third embodiment; and FIG. 11 is an explanatory diagram for explaining a compositing process by an image processor according to the third embodiment.

DETAILED DESCRIPTION OF THE EMBODIMENT(S)

Figure 1:
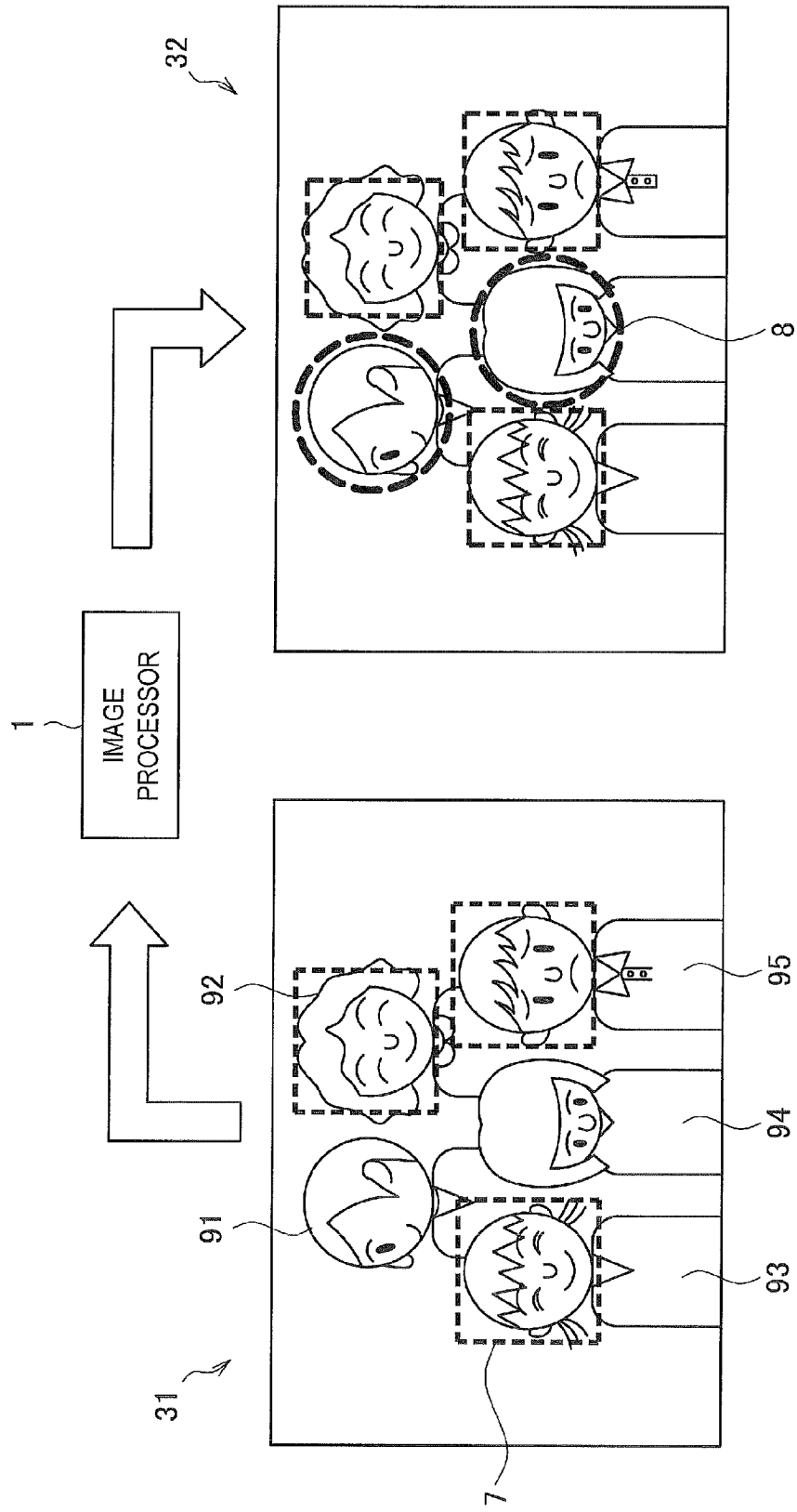
FIG. 1 is an explanatory diagram illustrating an overview of an image processor according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order:

1. Overview of information processing device according to embodiment of present disclosure
2. Embodiments
  2-1. First embodiment
    2-1-1. Configuration
    2-1-2. Operational process
    2-1-3. Modification 1
    2-1-4. Modification 2
  2-2. Second embodiment
    2-2-1. Operational process
    2-2-2. Modification 3
  2-3. Third embodiment
3. Conclusion <<1. Overview of information processing device according to embodiment of present disclosure>>

The present disclosure may be carried out in various embodiments, examples of which are described in detail from sections (2-1. First embodiment) to (2-3. Third embodiment). Also, an information processing device according to the present embodiment (information processing device 1) is equipped with:

A. a recognition unit (11) that recognizes a face area from a captured image;
B. a storage controller (13) that causes a storage unit (2) to store face recognition information indicating a face area recognized by the recognition unit; and
C. a display controller (14) that superimposes onto a display unit a display indicating, as a face area candidate in a current captured image captured by an image capture unit (4) according to external instructions, an area that is among areas corresponding to a first face area indicated by face recognition information from another captured image stored in the storage unit, but is not included in a second face area recognized by the recognition unit from the current captured image, distinguishably from a display indicating the second face area.

An image processor according to an embodiment of the present disclosure takes, from a currently captured image captured by an image capture unit according to external instructions, an area in which, although face recognition fails, a face area is determined to exist, and causes a display unit to display the area as a face area candidate distinguishably from an image in which face recognition succeeded. Note that in the present specification, the sensing of light by an image sensor is designated image capture. For example, the image process is included in a device such as a fixed camera, a handheld camera held by a user, or a wearable camera attached to a user, animal, vehicle, or the like.

For this reason, the recognition unit first conducts face recognition on an image captured continuously or at designated timings (the other captured image), and outputs face recognition information. Face recognition information refers to information that includes information indicating the position, range, capture time, smile level, or the like of a recognized face area.

The storage controller then causes the storage unit to cumulatively store face recognition information output from the recognition unit. In this way, by having the storage controller cause face recognition information with a smaller data size compared to a captured image to be stored, it is possible to reduce the used storage capacity of the storage unit over the case of causing captured images to be stored.

Subsequently, the recognition unit conducts face recognition on a captured image (the current captured image) that the image capture unit captures according to external instructions, such as the press of a shutter button, or image capture instructions given via communication.

The display controller then determines a face area candidate in the current captured image by associating the current captured image and the accumulated face recognition information. More specifically, the display controller determines a face area candidate by associating a face area indicated by face recognition information with an area in which face recognition failed from the current captured image. In other words, from among areas of the current captured image that correspond to a face area recognized in another captured image (a first face area), the display controller determines an area not included in an area in which face recognition succeeded from the current captured image (a second face area) as a face area candidate. For example, the display controller determines, as a face area candidate, a face area of a subject for whom, although face recognition had been successful because the subject was looking forward up until immediately before acquiring the current captured image, face recognition now fails because the subject looked sideways during the acquisition of the current captured image. Hereinafter, such a process of determining a face area candidate by the display controller will also be designated the associating process.

After that, the display controller reports to the user by causing a display unit to superimpose a display indicating the determined face area candidate onto the current captured image, distinguishably from a display indicating an area in which face recognition succeeded.

In this way, an image processor is able to use face recognition information from another image to determine, as a face area candidate, a face area in which face recognition failed with the current captured image alone because a subject is looking sideways or the like, and report the determined face area candidate to the user. For this reason, the image processor is able to clearly inform the user of the existence of a subject for whom face recognition failed, and prompt the user to remind the subject to pay attention and acquire a current captured image again.

At this point, an overview of such operations for superimposing a display indicating a face area candidate by the image processor will be specifically described with reference to FIG. 1. FIG. 1 is an explanatory diagram illustrating an overview of an image processor according to an embodiment of the present disclosure. As illustrated in FIG. 1, the image processor 1 conducts an associating process on a current captured image 31, and causes a display unit to display an associated current captured image 32.

More specifically, first, the image processor 1 may recognize the faces of subjects 92, 93, and 95 who are looking forward from the current captured image 31. For this reason, as indicated in the image 31, the image processor 1 superimposes confirmed recognition indicators 7, which are displays indicating areas in which face recognition succeeded from the current captured image 31, onto the respective face areas of the subjects 92, 93, and 95.

On the other hand, the image processor 1 fails to recognize the faces of subjects 91 and 94 who are not looking forward in the current captured image 31. Accordingly, by conducting the associating process discussed above using pre-accumulated face recognition information, the image processor 1 is capable of determining the face areas of the subjects 91 and 92 as face area candidates. After that, as indicated in the current captured image 32, the image processor 1 superimposes tentative recognition indicators 8, which are displays indicating face area candidates, onto the respective face areas of the subjects 91 and 92. Note that, as illustrated in FIG. 1, the tentative recognition indicators 8 are displayed distinguishably from the confirmed recognition indicators 7.

The above thus describes an overview of an image processor according to an embodiment of the present disclosure.

<<2. Embodiments>>

<2-1. First Embodiment>

[2-1-1. Configuration]

Figure 2:
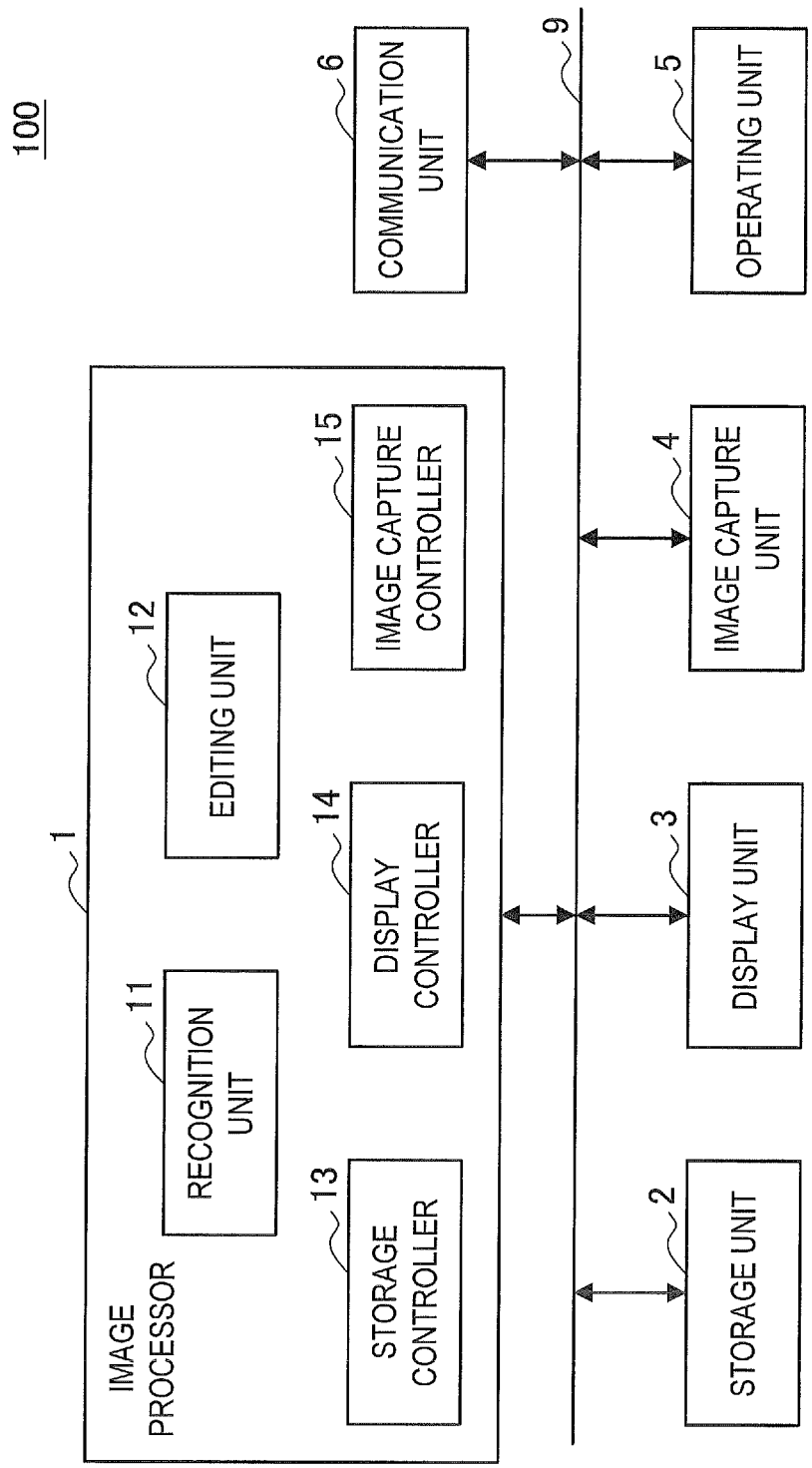
FIG. 2 is a block diagram illustrating a configuration of a camera according to the first embodiment.

First, a configuration of a camera that includes an image processor 1 according to the first embodiment will be described with reference to FIG. 2. Note that FIG. 2 is a block diagram illustrating a configuration of a camera 100 according to the first embodiment. As illustrated in FIG. 2, the camera 100 includes an image processor 1, a storage unit 2, a display unit 3, an image capture unit 4, an operating unit 5, and a communication unit 6. Also, the respective structural elements of the camera 100 are respectively connected via a bus 9. Hereinafter, each structural element of the camera 100 will be described in detail.

(Communication Unit)

The communication unit 6 is a module for communicating via a wired or wireless network such as a local area network (LAN) or phone line, and includes functions for accepting external instructions. Specifically, the communication unit 6 accepts instructions such as image capture instructions and image compositing instructions transmitted from another information processing device. Otherwise, the communication unit 6 may also transmit an image processed by the image processor 1 to another information processing device.

(Operating Unit)

The operating unit 5 includes functions for accepting external instructions. Specifically, the operating unit 5 accepts input operations such as image capture instructions and compositing instructions from a user. For example, the operating unit 5 is realized by a shutter button, or by a touch panel integrally formed with the display unit 3.

(Image Capture Unit)

The image capture unit 4 includes an image sensor, image capture optics that include an image capture lens, and a captured image signal processor. The image capture unit 4 outputs data of a captured image in the form of a digital signal. The image capture unit 4 captures an image according to image capture instructions accepted by the operating unit 5 or the communication unit 6, or under control by an image capture controller 15. Note that the image sensor is realized by a charge-coupled device (CCD) imager or a complementary metal-oxide-semiconductor (CMOS) imager, for example.

(Display Unit)

The display unit 3 displays a current captured image captured by the image capture unit 4 according to external image capture instructions, on the basis of control by a display controller 14. Otherwise, the display unit 3 displays image continuously captured by the image capture unit 4 in real-time, without accepting external image capture instructions. An image captured by the image capture unit 4 and displayed in real-time in this way is hereinafter also designated a through-the-lens image. In addition, the display unit 3 is realized with a liquid crystal display (LCD) or organic light-emitting diode (OLED) display, for example.

(Storage Unit)

The storage unit 2 stores images captured by the image capture unit 4 and face recognition information output from a recognition unit 11. Also, the storage unit 2 is realized with a recording medium such as a memory card or other flash memory, or a Digital Versatile Disc (DVD), for example.

(Image Processor)

The image processor 1 includes functions for conducting a face area candidate determining process on a current captured image, and superimposing a tentative recognition indicator 8 indicating a determined face area candidate onto the current captured image. Also, as illustrated in FIG. 2, the image processor 1 functions as a recognition unit 11, an editing unit 12, a storage controller 13, a display controller 14, and an image capture controller 15.

Recognition Unit 11

The recognition unit 11 recognizes a face area of a subject depicted in a captured image. Specifically, the recognition unit 11 recognizes a smile area, which is a face area of a smiling face, and a frontal face area, which is a face area of a face looking forward. Furthermore, the recognition unit 11 is also able to recognize a smile level indicating the degree of a smile in a face area, and a frontal level indicating the degree of coincidence between the angle of a face and the optical axis of the image capture unit 4. The recognition unit 11 then outputs these recognition results as face recognition information.

Storage Controller 13

The storage controller 13 causes the storage unit 2 to store a current captured image, as well as face recognition information output from the recognition unit 11. Also, the storage controller 13 causes the storage unit 2 to store association data output from the display controller 14 discussed later. Herein, the storage controller 13 stores a current captured image and association data in correspondence with the time at which the current captured image was captured. Also, the storage controller 13 stores face recognition information in correspondence with the capture time of the image from which the recognition unit 11 recognized that face recognition information. In addition, the storage controller 13 may also cause the storage unit 2 to store an image captured by the image capture unit 4 for use in a process by the editing unit 12 in correspondence with the time at which that image was captured. Note that hereinafter, the act of the storage controller 13 causing the storage unit 2 to store something will also be referred to as the storage controller 13 recording something.

Display Controller 14

The display controller 14 determines a face area candidate in a current captured image according to the associating process discussed earlier, on the basis of accumulated face recognition information. At this point, the display controller 14 outputs, as an associating process result, association data indicating a position and range of a face area candidate. In addition, the display controller 14 causes the display unit 3 to superimpose a tentative recognition indicator 8 indicating the face area candidate onto the current captured image, distinguishably from a confirmed recognition indicator 7 that indicates an area recognized by the recognition unit 11. Note that hereinafter, the act of the display controller 14 causing the display unit 3 to display something will also be referred to as the display controller 14 displaying something.

Editing Unit 12

The editing unit 12 edits an area of a face area candidate in a current captured image. For example, the editing unit 12 edits so as to substitute an area of a face area candidate in a current captured image with an area corresponding to the face area candidate in another captured image that was captured and recorded at a time before or after the current captured image was captured. Additionally, the editing unit 12 may also edit an area recognized as a face by the recognition unit 11 from a current captured image.

Image Capture Controller 15

The image capture controller 15 includes functions for controlling the image capture unit 4 to acquire a captured image. For example, the image capture controller 15 controls the image capture unit 4 according to image capture instructions accepted by the operating unit 5 or the communication unit 6, and acquires a current captured image. In addition, the image capture controller 15 may also control the image capture unit 4 to continuously capture and acquire a through-the-lens image, even without image capture instructions. Furthermore, the image capture controller 15 may also cause the image capture unit 4 to capture a captured image for use in an editing process by the editing unit 12.

(Supplemental Remarks)

The image processor 1, storage unit 2, display unit 3, image capture unit 4, and operating unit 5 discussed above may also form separate information processing devices that respectively include a communication unit 6. In this case, the image processor 1 may conduct the associating process and the superimposing of a tentative recognition indicator 8 by controlling the storage unit 2, the display unit 3, the image capture unit 4, and the operating unit 5 via a wired or wireless network.

The above thus describes respective configurations of a camera 100 and an image processor according to an embodiment of the present disclosure.

[2-1-2. Operational Process]

Figure 3:
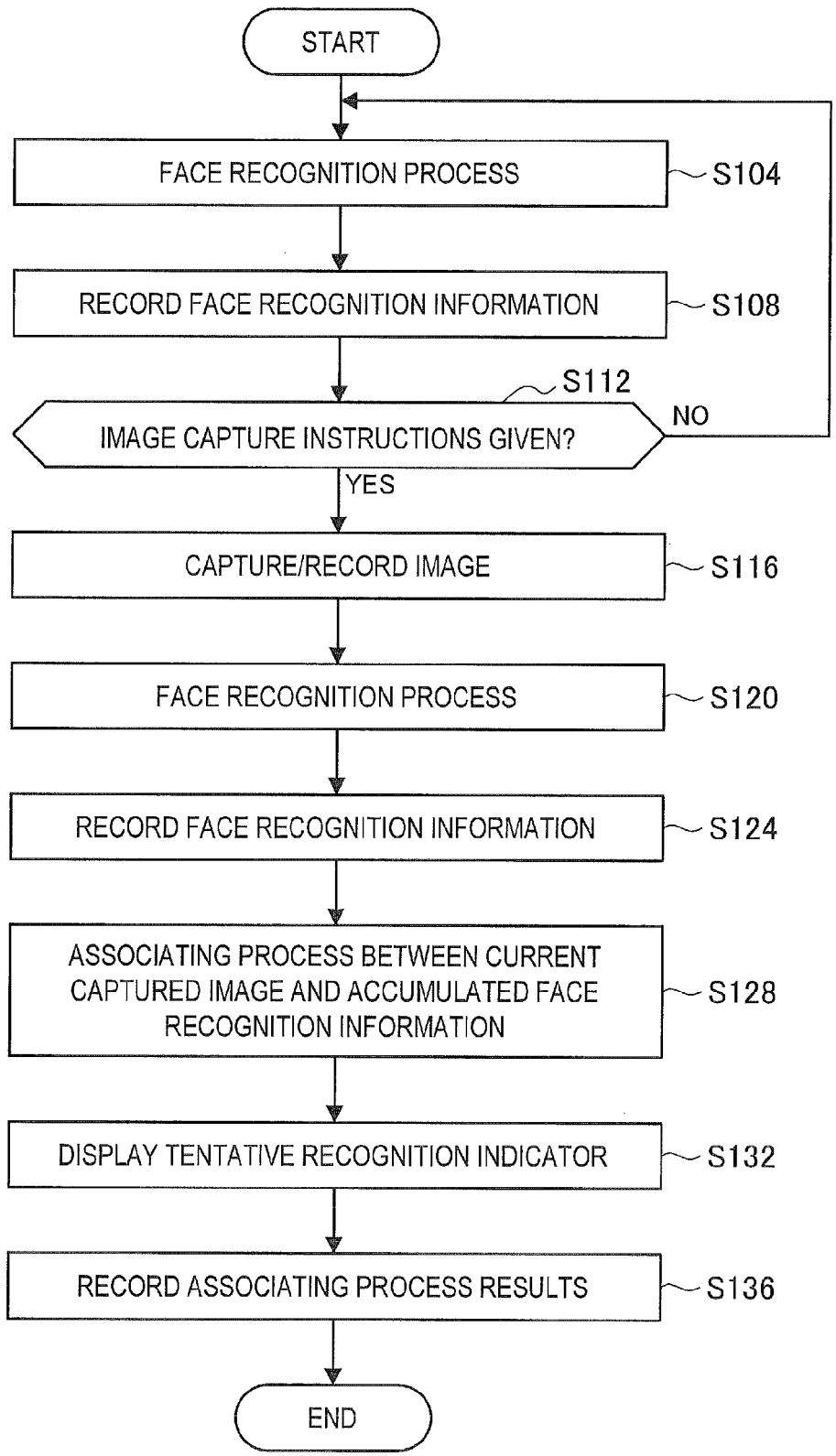
FIG. 3 is a flowchart illustrating operations of an image processor according to the first embodiment.

Next, operations of the image processor 1 will be described with reference to FIGS. 3 and 4. FIG. 3 is a flowchart illustrating operations of an image processor 1 according to the first embodiment. As illustrated in FIG. 3, first, in step S104 the recognition unit 11 recognizes a face from a through-the-lens image, and outputs face recognition information. Subsequently, in step S108, the storage controller 13 records the face recognition information output from the recognition unit 11. Then, in step S112 the image capture controller 15 determines whether or not the operating unit 5 or the communication unit 6 has accepted image capture instructions.

In the case where image capture instructions have not been accepted (S112/No), the process returns again to step S104. Thus, since steps S104 to S112 are repeated, the storage controller 13 cumulatively records face recognition information. Note that since the storage controller 13 records face recognition information with a smaller data size compared to a captured image to be stored, it is possible to reduce the used storage capacity of the storage unit 2 over the case of causing captured images to be stored.

Herein, assume that the image processor 1 cumulatively records face recognition information by repeating steps S104 to S112 even after accepting image capture instructions and ending the processing in step S116 and thereafter to be discussed later. Thus, the image processor 1 is able to record face recognition information without gaps, even in the case where there are image capture instructions. In addition, the image processor 1 is also able to conduct the associating process at some other time with an algorithm that differs from the image capture date, on the basis of recorded face recognition information.

Meanwhile, in the case where image capture instructions have been accepted (S112/Yes), in step S116 the image capture controller 15 causes the image capture unit 4 to capture an image, and the storage controller 13 records the captured current captured image. Subsequently, in step S120 the recognition unit 11 recognizes a face from the current captured image, and outputs face recognition information. Then, in step S124 the storage controller 13 records the face recognition information output from the recognition unit 11.

Subsequently, in step S128 the display controller 14 conducts an associating process on the current captured image and the accumulated face recognition information. Note that the face recognition information used in this associating process is the face recognition information accumulated in steps S104 to S108 at times before the current captured image was captured. The specific processing details of the associating process will be discussed later.

Next, in step S132 the display controller 14 superimposes a tentative recognition indicator 8 onto a face area candidate of the current captured image, on the basis of the associating process result, which is association data indicating a position and range of a face area candidate. Also, the display controller 14 superimposes a confirmed recognition indicator 7 onto the current captured image, on the basis of the face recognition information for the current captured image that was recorded in the above step S124. For this reason, the display controller 14 is able to clearly inform the user of the existence of a subject for whom face recognition failed, and prompt the user to remind the subject to pay attention and capture the image again.

Lastly, in step S136 the storage controller 13 records the association data. For this reason, at a later date, for example, the image processor 1 is able to superimpose a tentative recognition indicator 8 on the basis of association data recorded at the same time as the current captured image. Similarly, the image processor 1 is able to superimpose a confirmed recognition indicator 7 on the basis of face recognition information recorded at the same time as the current image capture time.

Hereinafter, the associating process in step S128 will be specifically described with reference to FIG. 4.

Figure 4:
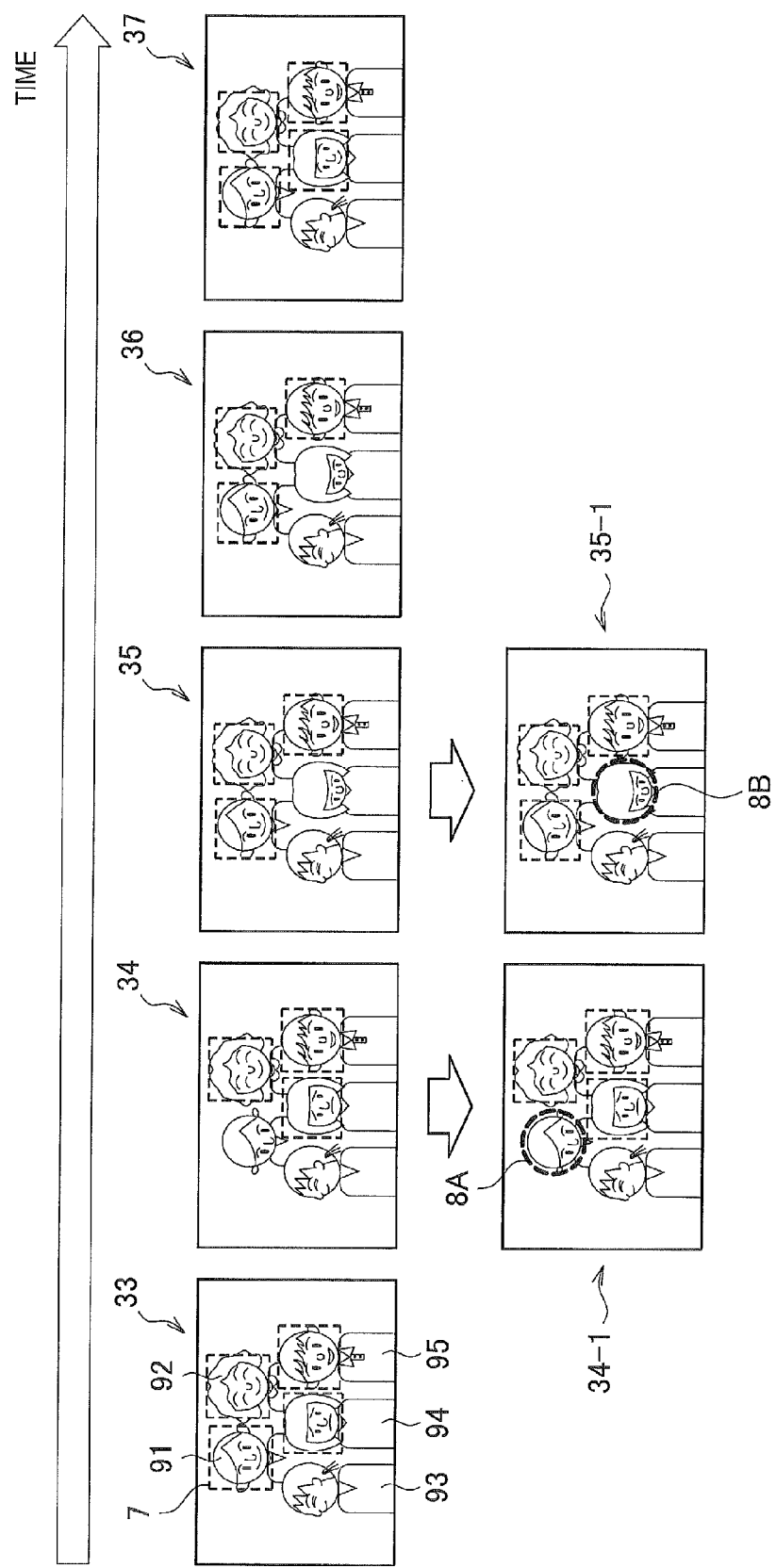
FIG. 4 is an explanatory diagram for explaining an associating process by a display controller according to the first embodiment.

FIG. 4 is an explanatory diagram for explaining an associating process by a display controller 14 according to the first embodiment. As illustrated in FIG. 4, the display controller 14 may superimpose confirmed recognition indicators 7 on the basis of face recognition information for images 33, 34, 35, 36, and 37.

Various algorithms are applicable to the associating process by the display controller 14. Accordingly, in the present specification, examples of two algorithms will be described. These algorithms conduct an associating process that treats a subject recognized with face recognition information acquired at a time close to the time at which a current captured image was captured as existing continuously in the same place. Otherwise, the display controller 14 may also record motion states of face areas indicating the same subject, and by predicting the motion, estimate the position of the face area when that subject's face fails to be recognized, for example.

(Associating Process According to First Algorithm)

The display controller 14 conducts the associating process and superimposes a tentative recognition indicator 8 in the case where the difference between the time at which a current captured image was captured and the time at which face recognition information was acquired is less than or equal to a first threshold value. Since the display controller 14 uses accumulated face recognition information, the time taken by the associating process is small compared to a comparative example in which images are accumulated and face recognition is conducted at the time of the associating process.

Hereinafter, the flow of an associating process according to the first algorithm will be described.

First, the display controller 14 selects face recognition information for an image that was captured before the time at which the current captured image was captured, and for which the difference in capture times is less than or equal to a first threshold value. The display controller 14 then conducts an associating process on the current captured image and the selected face recognition information, and determines a face area candidate. In other words, the display controller 14 treats a person whose recognized face is indicated by face recognition information from immediately before the capture time of the current captured image as also existing at the same place at the capture time, and determines an area corresponding to a face area of that person as a face area candidate. After that, the display controller 14 superimposes a tentative recognition indicator 8 onto the face area candidate.

Next, a specific applied example treating the image 34 as the current captured image will be described. At this point, assume that image data is recorded for the current captured image 34, whereas only face recognition information is recorded for the images 33, 35, 36, and 37.

First, the display controller 14 selects the face recognition information of the image 33 as the face recognition information of an image that was captured before the image 34 was captured, and for which the difference in capture times is less than or equal to a first threshold value. Subsequently, from among the face areas of the subjects 91, 92, 94, and 95 indicated by the selected face recognition information, the display controller 14 determines, as a face area candidate, an area corresponding to the face area of the subject 91 who is not included among the face areas of the subjects 92, 94, and 95 whose faces are recognized from the image 34. After that, the display controller 14 superimposes a tentative recognition indicator 8A onto an area corresponding to the face area of the subject 91, as illustrated in the image 34-1.

The above thus describes an associating process according to the first algorithm.

(Associating Process According to Second Algorithm)

The display controller 14 conducts the associating process and superimposes a tentative recognition indicator 8 in the case of satisfying the following two conditions.

The first condition is that the difference between the time at which a current captured image was captured and the time at which face recognition information was acquired is less than or equal to a second threshold value. Herein, the second threshold value is taken to be larger than the first threshold value in the first algorithm. Additionally, the first condition may also be that the difference is greater than the first threshold value but less than or equal to the second threshold value. For this reason, the display controller 14 is able to conduct the associating process using face recognition information with a more distant capture time that was not selected with the first algorithm. However, in the case where the capture time is greatly distant, it is conceivable that a subject has moved and is not present at the same place. Accordingly, in this algorithm, the following second condition is set.

The second condition is that the number of matches between an area corresponding to a face area indicated by selected face recognition information and an area in which face recognition succeeded from a current captured image is equal to or greater than a third threshold value. In other words, if the number of matching subjects whose faces are recognized is equal to or greater than the third threshold value, the display controller 14 conducts the associating process even if an amount of time equal to or greater than the first threshold value has passed.

For example, in the case of capturing a group photo or the like, the subjects are still, and thus most faces will continue to be recognized. Consequently, it is conceivable that there will be a large number of matching subjects whose faces are recognized. Accordingly, if the number of matching subjects whose faces are recognized is equal to or greater than the third threshold value, the display controller 14 conducts the associating process as though there were no subject motion, even if an amount of time equal to or greater than the first threshold value has passed. In this way, with the second condition, the display controller 14 is able to determine a face area candidate while accounting for the possibility of subject motion.

Hereinafter, the flow of an associating process according to the second algorithm will be described with reference to FIG. 5.

Figure 5:
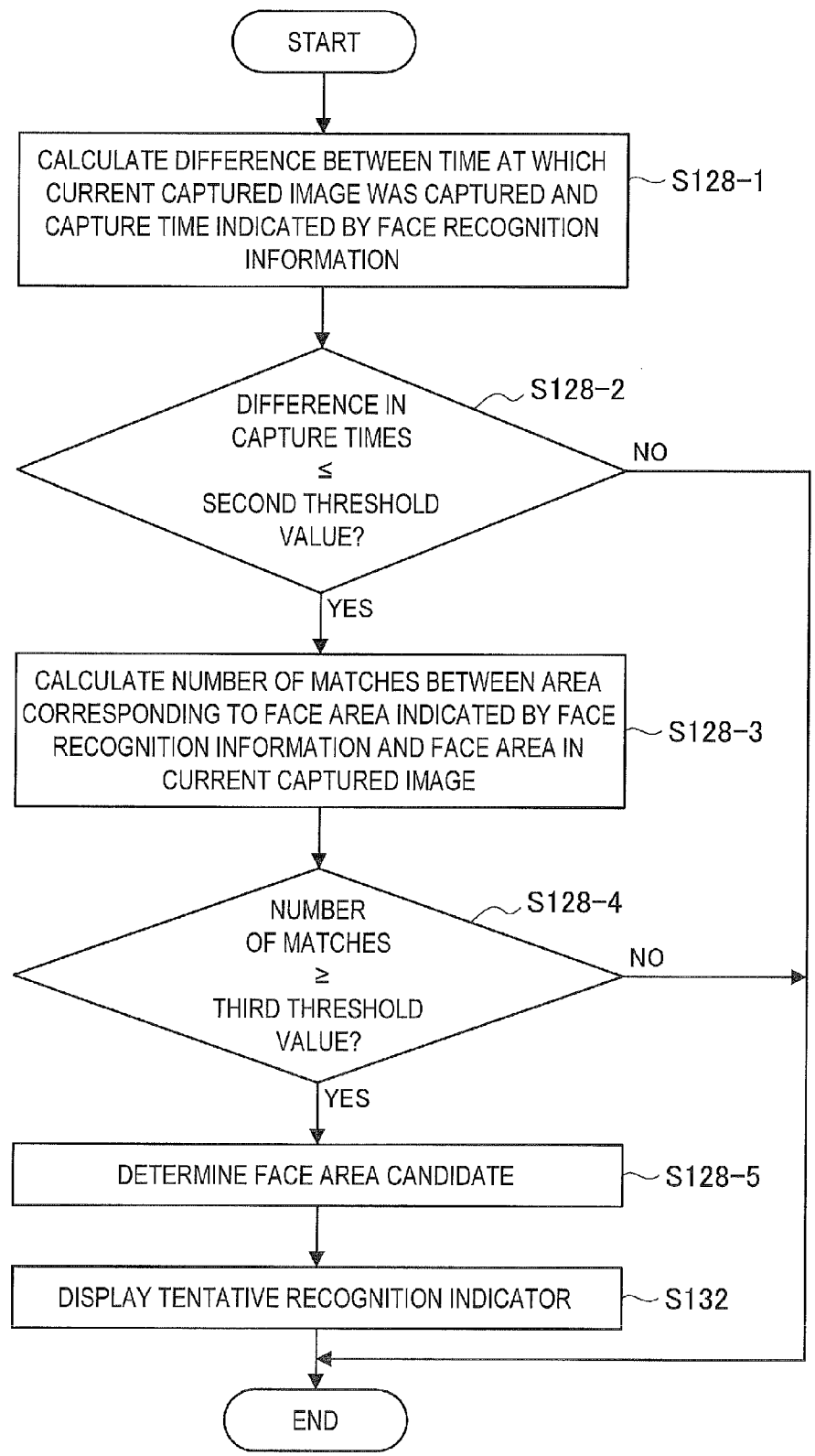
FIG. 5 is an explanatory diagram for explaining an associating process according to a second algorithm by a display controller according to the first embodiment.

FIG. 5 is an explanatory diagram for explaining an associating process according to a second algorithm by a display controller 14 according to the first embodiment. As illustrated in FIG. 5, first, in step S128-1 the display controller 14 calculates the difference between the capture time indicated by the face recognition information, or in other words the capture time of an image in which face recognition information was recognized, and the time at which a current captured image was captured.

Next, in step S128-2 the display controller 14 determines whether or not the calculated difference is less than or equal to the second threshold value, as discussed above as the first condition. At this point, as discussed earlier, the display controller 14 may also determine whether or not the calculated difference is greater than the first threshold value and also less than or equal to the second threshold value.

Subsequently, in the case where the difference is less than or equal to the second threshold value (S128-2/Yes), in step S128-3 the display controller 14 calculates the number of matches between an area corresponding to a face area indicated by the face recognition information and an area in which face recognition succeeded from the current captured image.

Next, in step S128-4 the display controller 14 determines whether or not the calculated number of matches is equal to or greater than the third threshold value, as discussed above as the second condition.

Subsequently, in the case where the number of matches is equal to or greater than the third threshold value (S128-4/Yes), in step S128-5 the display controller 14 determines, as a face area candidate, an area in which face recognition failed from the current captured image, from among the areas of the current captured image that correspond to face areas indicated by the face recognition information.

In step S132 as described earlier, the display controller 14 superimposes a tentative recognition indicator 8 onto the area determined to be a face area candidate in this way.

Note that in the case where the difference between the time at which the current captured image was captured and the time indicated by the face recognition information is greater than the second threshold value (S128-2/No), the display controller 14 does not determine a face area candidate and does not superimpose a tentative recognition indicator 8. Also, in the case where the number of matches between an area corresponding to a face area indicated by the face recognition information and an area in which face recognition succeeded from the current captured image is less than the third threshold value (S128-4/No), the display controller 14 does not determine a face area candidate, and does not superimpose a tentative recognition indicator 8.

For the second algorithm described above, a specific applied example treating the image 35 as the current captured image will now be described. At this point, image data is recorded for the current captured image 35, whereas only face recognition information is recorded for the images 33, 34, 36, and 37.

First, assume that the display controller 14 determines that the difference between the capture time indicated by the face recognition information of the image 33 and the capture time of the image 35 is greater than the first threshold value but less than or equal to the second threshold value. Herein, assume that there are three matches between the face areas of the subjects 91, 92, 94, and 95 indicated by the face recognition information of the image 33 and the face areas of the subjects 91, 92, and 95 whose faces were recognized from the image 35, and that this value is equal to or greater than the third threshold value. In this case, from among the face areas of the subjects 91, 92, 94, and 95 indicated by the selected face recognition information, the display controller 14 determines, as a face area candidate, an area corresponding to the face area of the subject 94 who is not included among the face areas of the subjects 91, 92, and 95 whose faces are recognized from the image 35. Subsequently, the display controller 14 superimposes a tentative recognition indicator 8B onto an area corresponding to the face area of the subject 94, as illustrated in the image 35-1.

The above thus describes an associating process according to the second algorithm.

(Supplemental Remarks)

In the above, the display controller 14 conducts the associating process using face recognition information from an image that was captured in steps S104 to S108 at a time before the current captured image was captured. However, the present disclosure is not limited to such an example. For example, the display controller 14 may also conduct the associating process using face recognition information from an image that was captured at a time after the current captured image was captured.

More specifically, after a current captured image is captured (that is, after the above step S124), the above steps S104 to S108 are repeated, and in the subsequent step S128, the display controller 14 may conduct the associating process using face recognition information accumulated at that point. The display controller 14 may conduct the associating process using face recognition information from both before and after the capturing of a current captured image, or conduct the associating process using only one thereof.

Hereinafter, an example of conducting the associating process according to the first algorithm using face recognition information from an image captured at a time after a current captured image is captured will be specifically described, treating the image 36 as the current captured image. At this point, assume that image data is recorded for the current captured image 36, whereas only face recognition information is recorded for the images 33, 34, 35, and 37.

First, the display controller 14 selects the face recognition information of the image 37 as the face recognition information of an image that was captured after the image 36 was captured, and for which the difference in capture times is less than or equal to the first threshold value. Next, from among the face areas of the subjects 91, 92, 94, and 95 indicated by the selected face recognition information of the image 37, the display controller 14 determines, as a face area candidate, an area corresponding to the face area of the subject 94 who is not included among the face areas of the subjects 91, 92, and 95 whose faces are recognized from the image 36. Subsequently, the display controller 14 superimposes a tentative recognition indicator 8 onto an area corresponding to the face area of the subject 94 in the image 36.

The display controller 14, by conducting associating processes according to the algorithms described above as an example, superimposes a confirmed recognition indicator 7 or a tentative recognition indicator 8 onto the subjects 91, 92, 93, 94, and 95.

The above thus describes an operational process of an image processor 1 according to the first embodiment.

[2-1-3. Modification 1]

Next, a modification of the first embodiment will be described. An image processor 1 according to the present modification is configured to display a tentative recognition indicator 8 in the case where the display unit 3 displays a through-the-lens image irrespectively of image capture instructions. Hereinafter, operations of the image processor 1 will be described with reference to FIG. 6.

Figure 6:
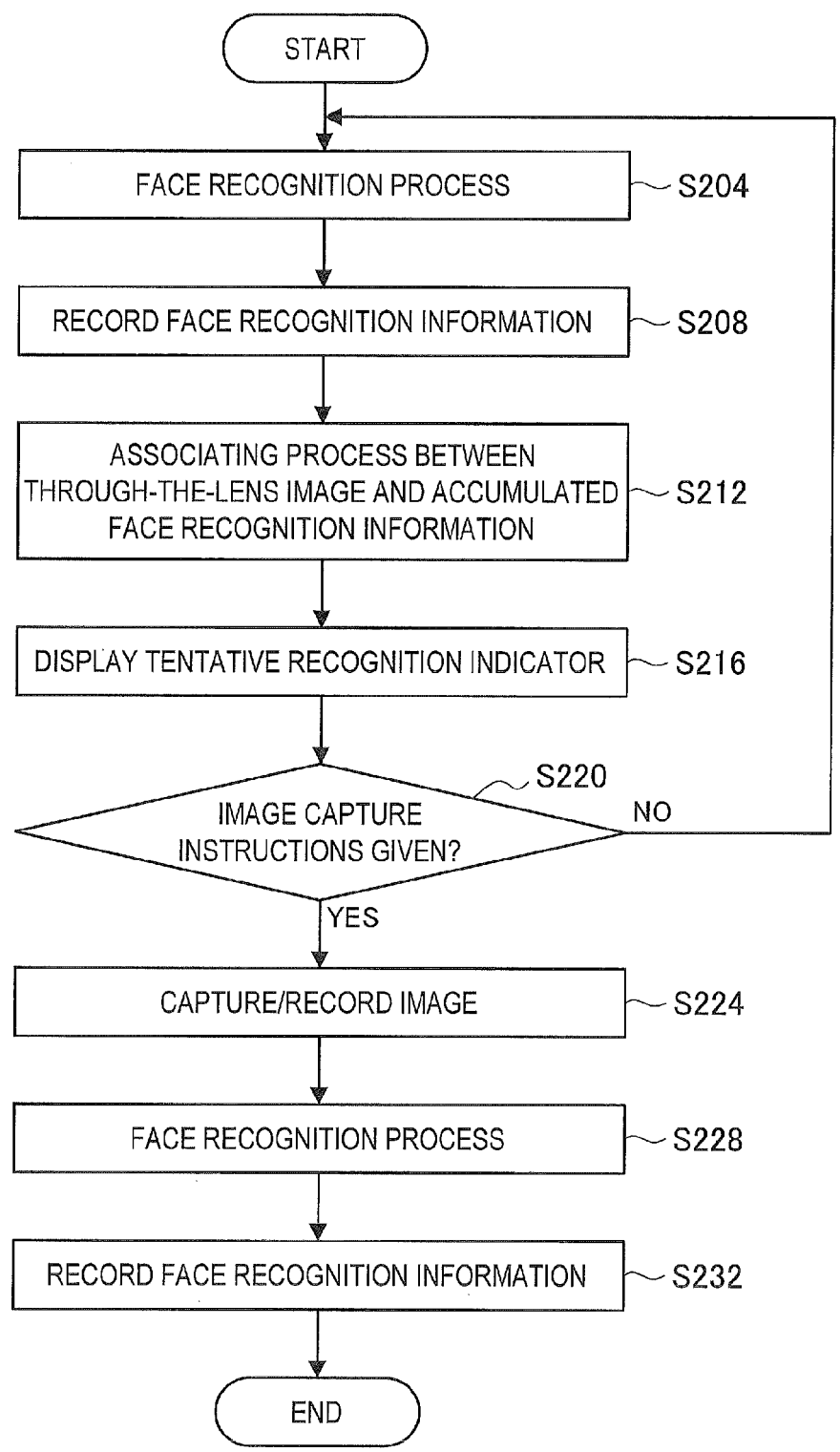
FIG. 6 is a flowchart illustrating operations of an image processor according to modification 1.

FIG. 6 is a flowchart illustrating operations of an image processor 1 according to modification 1. As illustrated in FIG. 6, first, in step S204 the recognition unit 11 recognizes a face from a through-the-lens image, and outputs face recognition information. Subsequently, in step S208 the storage controller 13 records the face recognition information output from the recognition unit 11.

Subsequently, in step S212 the display controller 14 conducts an associating process on a through-the-lens image and accumulated face recognition information. The associating process at this point is as described above with reference to FIG. 4. After that, in step S216 the display controller 14 superimposes a tentative recognition indicator 8 onto a face area candidate in the through-the-lens image, on the basis of association data obtained in the above step S212. Thus, before the user issues image capture instructions, the display controller 14 is able to clearly inform the user of the existence of a subject for whom face recognition failed, and prompt the user to remind the subject to pay attention.

After that, in step S220 the image capture controller 15 determines whether or not the operating unit 5 or the communication unit 6 has accepted image capture instructions. In the case where image capture instructions have not been accepted (S220/No), the process returns again to step S204. On the other hand, in the case where image capture instructions have been accepted (S220/Yes), in step S224 the image capture controller 15 causes the image capture unit 4 to capture an image, and the storage controller 13 records the captured current captured image. Subsequently, in step S228 the recognition unit 11 recognizes a face from the current captured image, and outputs face recognition information. Lastly, in step S232 the storage controller 13 records the face recognition information output from the recognition unit 11.

The above thus describes an operational process of an image processor 1 according to modification 1.

[2-1-4. Modification 2]

Next, another modification of the first embodiment will be described. An image processor 1 according to the present modification does not make a new capture in response to image capture instructions, but records a through-the-lens image at the timing of the image capture instructions as a current captured image, together with association data from an already-conducted associating process. Hereinafter, operations of the image processor 1 will be described with reference to FIG. 7.

Figure 7:
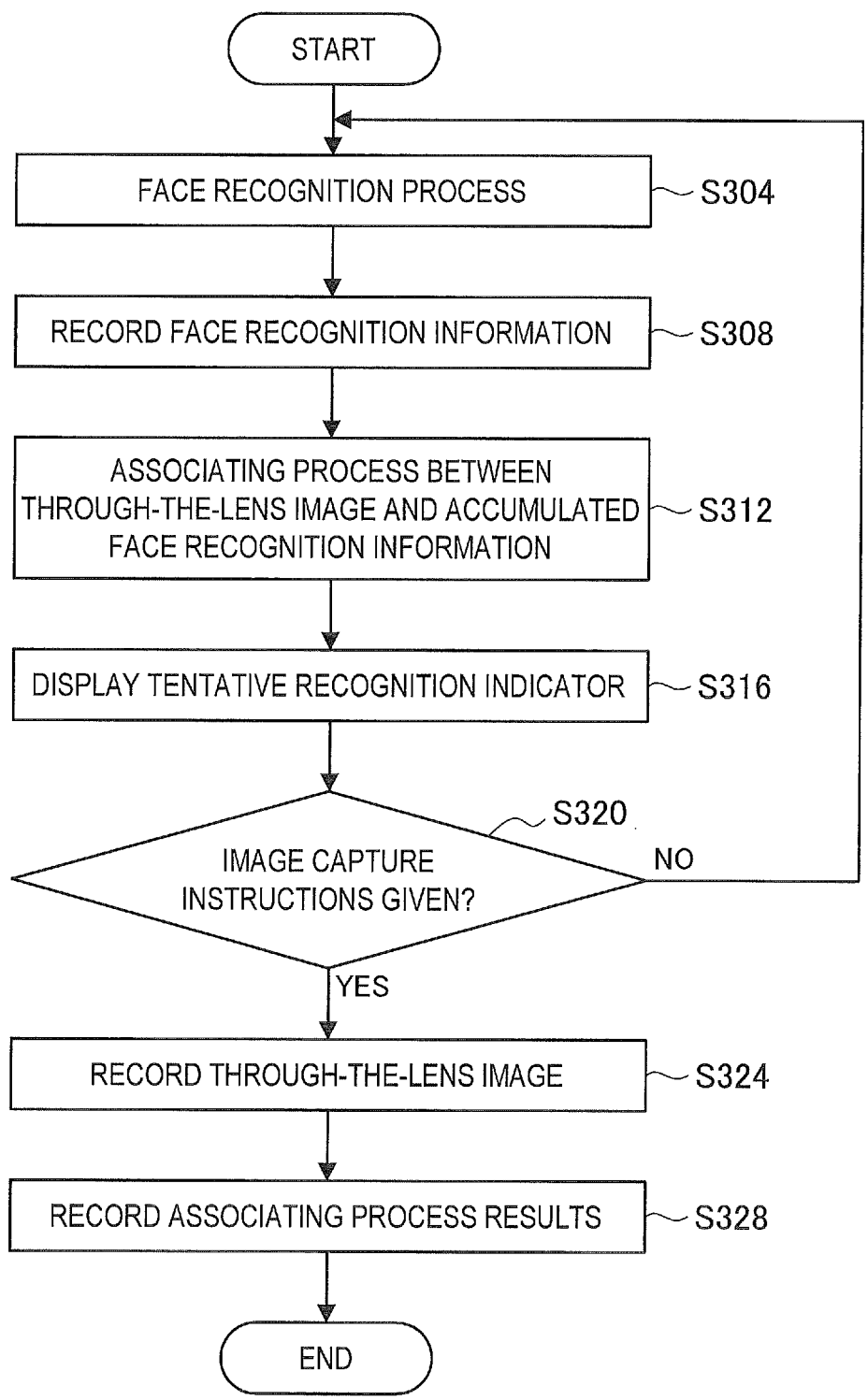
FIG. 7 is a flowchart illustrating operations of an image processor according to modification 2.

FIG. 7 is a flowchart illustrating operations of an image processor 1 according to modification 2. As illustrated in FIG. 7, in steps S304 to S320 the image processor 1 operates similarly as in steps S204 to S220 described above.

Subsequently, in step S324 the storage controller 13 records the immediately previous through-the-lens image. Then, in step S328 the storage controller 13 records association data, which is the result of the immediately previous associating process in step S312, in correspondence with the immediately previous through-the-lens image.

In this way, in the case of image capture instructions, the image processor 1 does not duplicate the image capture and associating processes.

The above thus describes an operational process of an image processor 1 according to modification 2.

<2-2. Second Embodiment>

An image processor 1 according to the present embodiment performs compositing by substituting in an area corresponding to another image with respect to an area in which face recognition succeeded, or an area of a face area candidate. Since the configuration of the present embodiment is as described in the first embodiment, detailed description will be reduced or omitted herein. Hereinafter, operations of the image processor 1 will be described with reference to FIG. 8.

[2-2-1. Operational Process]

Figure 8:
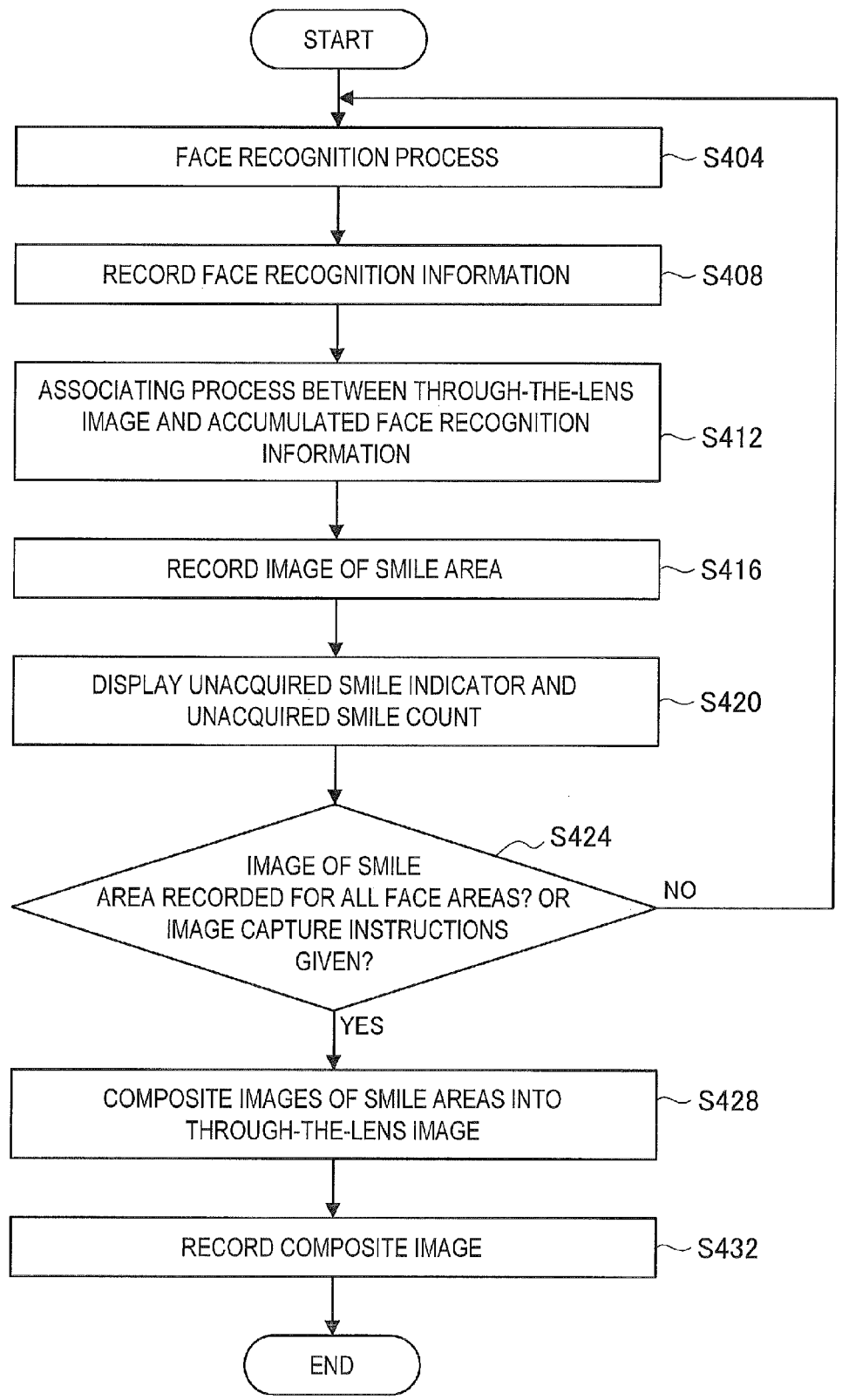
FIG. 8 is a flowchart illustrating operations of an image processor according to the second embodiment.

FIG. 8 is a flowchart illustrating operations of an image processor 1 according to the second embodiment. As illustrated in FIG. 8, first, in step S404 the recognition unit 11 recognizes a face from a through-the-lens image, and outputs face recognition information. Herein, as discussed earlier, the face recognition information includes a smile level that indicates the degree of a smile in a recognized face area. Subsequently, in step S408 the storage controller 13 records the face recognition information output from the recognition unit 11.

Subsequently, in step S412 the display controller 14 conducts an associating process on a through-the-lens image and accumulated face recognition information. The associating process at this point is as described above with reference to FIG. 4.

After that, in step S416 the storage controller 13 records an image of an area in which a face was recognized in the through-the-lens image, and whose smile level is higher than a designated threshold value, as a smile area image together with the position and range thereof.

Subsequently, in step S420 the display controller 14 displays an unacquired smile indicator, which indicates a face area in which a smile area image has not been recorded yet, as well as an unacquired smile count, which indicates the number of relevant face areas. More specifically, the display controller 14 superimposes an unacquired smile indicator onto an area in which a face was recognized or a face area candidate in the through-the-lens image, and in which a smile area image has not been recorded. Additionally, the display controller 14 displays, as an unacquired smile count, the number of areas in which a smile area image has not been recorded from among the areas in which a face was recognized or the face area candidates in the through-the-lens image. For this reason, the display controller 14 is able to inform the user how many more people are left to smile in order to capture an image with everyone smiling.

Then, in step S424 the storage controller 13 determines whether or not a smile area image is recorded for all face areas of recognized face areas and face area candidates, and the image capture controller 15 determines whether or not the operating unit 5 or the communication unit 6 has accepted image capture instructions.

In the case where a smile area image has not been recorded for all face areas, and area image capture instructions have not been accepted (S424/No), the process returns again to step S404. Thus, the storage controller 13 is able to cumulatively record smile area images. Furthermore, the image capture controller 15 is also able to cause the image capture unit 4 to repeatedly capture images until smile area images corresponding to all areas of recognized face areas and face area candidates are recorded. Note that in the case of recognizing a smile area with a higher smile level for the same face area, the storage controller 13 updates the already recorded smile area image. The storage controller 13 may also delete a face image from the storage unit 2 in the case where a designated amount of time has elapsed since recording, or in the case of sensing subject motion with the associating process in step S412. Thus, the storage capacity of the storage unit 2 may be reduced.

On the other hand, in the case where a smile area image is recorded for all face areas, or in the case where image capture instructions have been accepted (S424/Yes), in step S248 the editing unit 12 composites the smile area images with the through-the-lens image and outputs the result as the current captured image. More specifically, for the areas in which a face was recognized and the areas of face area candidates in the current captured image, the editing unit 12 composites smile area images corresponding to the relevant areas. For this reason, the image processor 1 is able to automatically generate a composite image in which all or most of the subjects whose faces were recognized in the current captured image, as well as the subjects whose faces were by coincidence not recognized at that time, are smiling.

After that, in step S432 the storage controller 13 records the composite image output by the editing unit 12.

In this way, in cases such as when compositing by substituting in images of another, better expression for face areas without a good expression in a current captured image, the image processor 1 is able to potentially substitute not only successfully recognized face areas, but also face area candidates.

The above thus describes an operational process of an image processor 1 according to the second embodiment.

[2-2-2. Modification 3]

Next, a modification of the second embodiment will be described. An image processor 1 according to the present modification displays smile area images corresponding to an area in which a face was recognized or an area of a face area candidate as candidate images selectable for compositing, and composites on the basis of a user operation. Hereinafter, operations of the image processor 1 will be described with reference to FIGS. 9A and 9B.

Figure 9A:
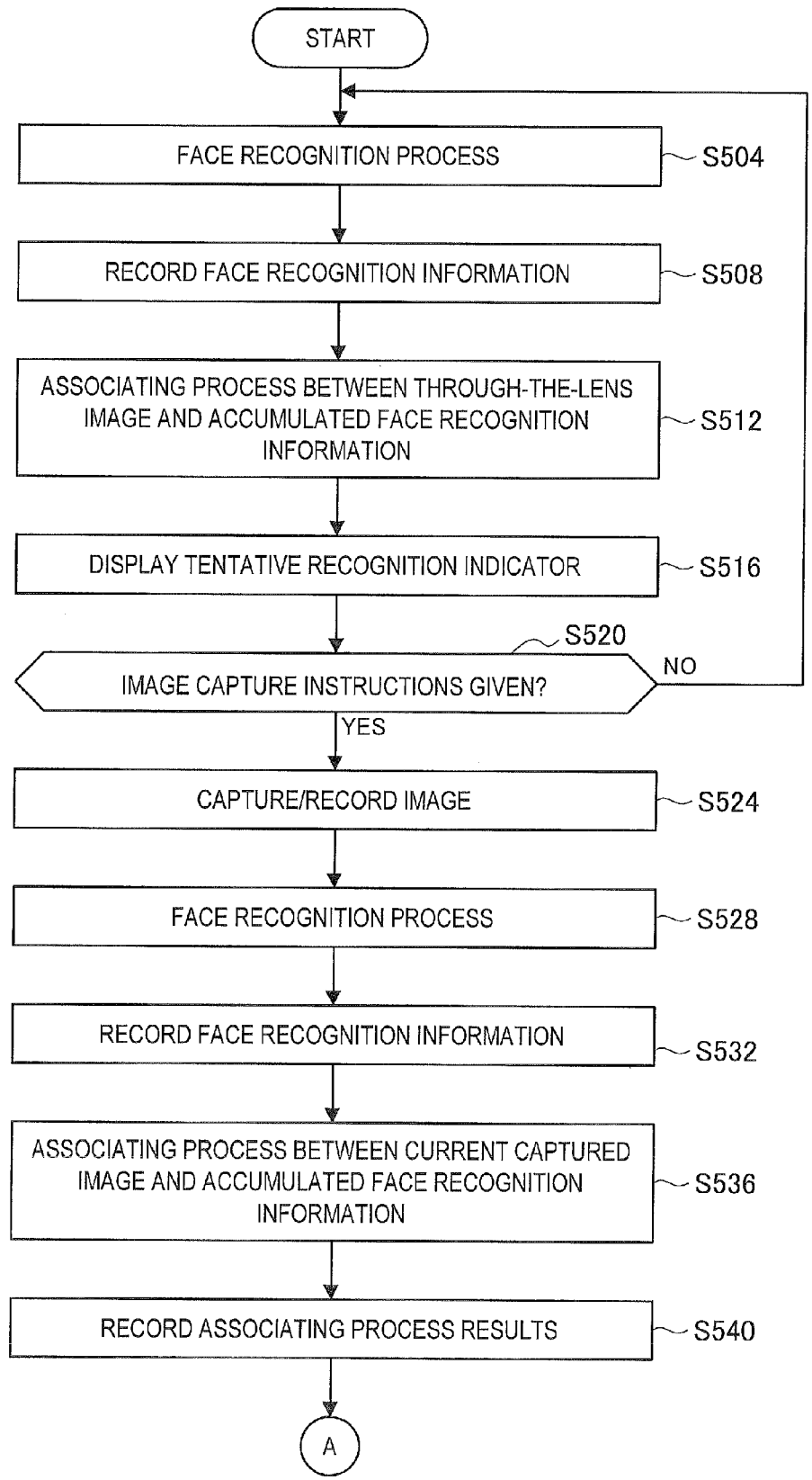
FIG. 9A is a flowchart illustrating operations of an image processor according to modification 3.

FIGS. 9A and 9B are flowcharts illustrating operations of an image processor 1 according to modification 3. As illustrated in FIG. 9A, in steps S504 to S520 the image processor 1 operates similarly as in steps S204 to S220 described above.

Next, in steps S524 to S536 the image processor 1 operates similarly as in steps S116 to S128 described above. Then, in step S540 the storage controller 13 records association data in correspondence with a current captured image.

After that, as illustrated in FIG. 9B, in step S544 the recognition unit 11 recognizes a face from a through-the-lens image, and outputs face recognition information. Subsequently, in step S548, the storage controller 13 records the face recognition information output from the recognition unit 11.

Then, in step S552 the storage controller 13 records an image of an area in which a face was recognized in the through-the-lens image, and whose degree of smile is higher than a designated threshold value, as a smile area image together with the position and range thereof.

After that, in step S556 the storage controller 13 determines whether or not steps S544 to S552 have been repeated a designated number of times. In the case where steps S544 to S552 have not been repeated the designated number of times (S556/No), the process returns again to step S544.

On the other hand, in the case where steps S544 to S552 have been repeated the designated number of times (S556/Yes), in step S560 the display controller 14 superimposes a non-smile indicator, which indicates a non-smile area, onto the current captured image. More specifically, on the basis of the association data output in step S536, the display controller 14 superimposes a non-smile indicator on a non-smile area not included among the smile areas from among the areas in which a face was recognized and face area candidates in the current captured image.

Subsequently, in step S564 the display controller 14 superimposes face images which are smile area images accumulated in steps S544 to S552, and which correspond to a non-smile face area in the current captured image, as candidate images. For this reason, the user is able to select a face image to composite from among candidate images. Herein, since face area candidates are areas in which a face was not even recognized, the question of a smile or not is not recognized either, and the face area candidates are included among the non-smile areas. Accordingly, in the case where a user looks at a current captured image and considers a face area candidate to be a smile, it is also possible to maintain the natural state of the original face area without compositing.

Then, in step S568, the editing unit 12 composites candidate images selected by user selections into the current captured image, and outputs a composite image. Lastly, in step S572 the storage controller 13 records the composite image output by the editing unit 12.

The above thus describes an operational process of an image processor 1 according to modification 3.

<2-3. Third Embodiment<

Next, a third embodiment will be described. An image processor 1 according to the present embodiment is installed in a server on a network, and composites images captured by multiple image capture devices. More specifically, the editing unit 12 composites an area corresponding to a face area candidate in an image captured by an image capture device different from the image capture device that captured a current captured image onto the area of the face area candidate in the current captured image. Hereinafter, an overview of operations by an image processor 1 according to the present embodiment will be described with reference to FIGS. 10 and 11.

FIG. 10 is an explanatory diagram illustrating an overview of an image processor 1 according to the third embodiment. As illustrated in FIG. 10, installed cameras 108A to 108D are installed at fixed points throughout an outdoor area. Hereinafter, the installed cameras 108A to 108D will be collectively designated the installed cameras 108 when not being described individually. The present embodiment envisions situations in which many installed cameras 108 are placed not only outdoors as illustrated in FIG. 10, but also indoors. In addition, a server 200 that includes the image processor 1 uses images captured by the installed cameras 108 or a camera used by being worn on a user to conduct a face recognition process, an associating process, and the superimposing of various indicators.

The user 98 illustrated in FIG. 10 is capturing subjects 96 and 97 with a camera 104. A server 200 is connected to the camera 104 and installed cameras 108 via wireless communication. The camera 104 and the installed cameras 108 have the configuration of a camera 100 described above with reference to FIG. 2, but with the image processor 1 removed.

First, the camera 104 and the installed cameras 108 transmit captured images to the server 200. The server 200 then conducts a face recognition process, the recording of face recognition information, and an associating process on the image received from the camera 104, and causes a display unit of the camera 104 to display an image superimposed with a tentative recognition indicator 8. Note that the camera 104 and the installed cameras 108 are taken to transmit position information indicating a current position together with an image to the server 200.

As illustrated in FIG. 10, although the subject 96 is facing in the direction of the camera 104, the subject 97 is facing in the direction of the installed camera 108A rather than in the direction of the camera 104. Consequently, whereas the face of the subject 96 is recognized, the face of the subject 97 is not recognized. For this reason, a confirmed recognition indicator 7 is superimposed onto the subject 96 while a tentative recognition indicator 8 is superimposed onto the subject 97 in a through-the-lens image.

At this point, operations of an image processor 1 included in the server 200 for the case where a current captured image is captured according to image capture instructions from the user 98 will be described with reference to FIG. 11.

FIG. 11 is an explanatory diagram for explaining a compositing process by an image processor 1 according to the third embodiment. As illustrated in FIG. 11, the server 200 includes an image processor 1 and a communication unit 6.

When a current captured image is captured according to image capture instructions from the user 98, the camera 104 transmits a current captured image 38 to the server 200. Note that in the current captured image 38, the face of the subject 96 is recognized, but the face of the subject 97 is not recognized. Meanwhile, the server 200 receives an image 39 captured by the installed camera 108A, which is an installed camera 108 installed near the position of the subject 97 and installed where the subject 97 is facing forward. Note that the face of the subject 97 is recognized in the image 39. Accordingly, the editing unit 12 composites a face image of the subject 97 whose face was recognized from the image 39 into a face area of the subject 97 given as a face area candidate of the current captured image 38, and generates a composite image 38-1.

In this way, the image processor 1 is able to conduct a compositing process with respect to a face area candidate of a current captured image, on the basis of an image obtained from a different image capture device.

The above thus describes an operational process of an image processor 1 according to the third embodiment.

<<3. Conclusion>>

As described above, an image processor 1 according to an embodiment of the present disclosure is able to present to the user a face area, in which face recognition failed from a current captured image captured according to image capture instructions, as a face area candidate, distinguishably from a face area in which face recognition succeeded. In addition, the image processor 1 is also able to composite a face image corresponding to another image into a face area candidate. Furthermore, the image processor 1 is able to composite a face image corresponding to another image into an area where a face was recognized. Also, since face recognition information successively accumulated by the image processor 1 is recorded in correspondence with image capture times, the image processor 1 is also able to apply, at a later date, an associating process according to an algorithm with even higher face area candidate estimation precision.

The foregoing thus describes preferred embodiments of the present disclosure in detail and with reference to the attached drawings. However, the technical scope of the present disclosure is not limited to such examples. It is clear to persons ordinarily skilled in the technical field of the present disclosure that various modifications or alterations may occur insofar as they are within the scope of the technical ideas stated in the claims, and it is to be understood that such modifications or alterations obviously belong to the technical scope of the present disclosure.

For example, it is possible to create a computer program for causing hardware such as a CPU, ROM, and RAM built into an information processing device to exhibit functions similar to each structural element of the above image processor 1. Also, a recording medium having such a computer program recorded thereon is also provided.

Additionally, the present technology may also be configured as below:

(1) An information processing device including:
   a recognition unit that recognizes a face area from a captured image;
   a storage controller that causes a storage unit to store face recognition information indicating a face area recognized by the recognition unit; and
   a display controller that superimposes onto a display unit a display indicating, as a face area candidate in a current captured image captured by an image capture unit according to an external instruction, an area that is among areas corresponding to a first face area indicated by face recognition information from another captured image stored in the storage unit, but is not included in a second face area recognized by the recognition unit from the current captured image, distinguishably from a display indicating the second face area.

(2) The information processing device according to (1), wherein the information processing device further includes:
   an editing unit that edits the face area candidate area.

(3) The information processing device according to (2),
   wherein the storage controller causes a storage unit to store the captured image, and
   wherein the editing unit composites, into the face area candidate area, an area corresponding to the face area candidate in a captured image that was captured and stored in the storage unit at a time before the current captured image is captured.

(4) The information processing device according to (2),
   wherein the storage controller causes a storage unit to store the captured image, and
   wherein the editing unit composites, into the face area candidate area, an area corresponding to the face area candidate in a captured image that was captured and stored in the storage unit at a time after the current captured image was captured.

(5) The information processing device according to any one of (2) to (4),
   wherein the display controller superimposes a candidate image onto the display unit, and
   wherein the editing unit composites the candidate image into the face area candidate area in the current captured image according to an external instruction.

(6) The information processing device according to any one of (2) to (5),
   wherein the editing unit edits an area corresponding to the first face area in the current captured image.

(7) The information processing device according to any one of (1) to (6),
   wherein the display controller superimposes a display indicating the face area candidate onto a current captured image that is captured by the image capture unit prior to the external instruction and displayed on the display unit in real-time.

(8) The information processing device according to any one of (1) to (7),
   wherein the face recognition information from the another captured image is face recognition information from a captured image that was captured at a time before the current captured image is captured.

(9) The information processing device according to any one of (1) to (7),
   wherein the face recognition information from the another captured image is face recognition information from a captured image that was captured at a time after the current captured image was captured.

(10) The information processing device according to any one of (1) to (9),
   wherein the display controller superimposes onto the display unit a display indicating the face area candidate in a case in which a difference between a time at which the current captured image was captured and a time at which the another captured image was captured is less than or equal to a first threshold value.

(11) The information processing device according to any one of (1) to (10),
   wherein the display controller superimposes onto the display unit a display indicating the face area candidate in a case in which a difference between a time at which the current captured image was captured and a time at which the another captured image was captured is less than or equal to a second threshold value, and the number of matches between the first face area and the second face area is greater than or equal to a third threshold value.

(12) The information processing device according to any one of (2) to (6),
   wherein the information processing device further includes:
      an image capture controller that controls the image capture unit,
   wherein the recognition unit recognizes a smile area from the captured image,
   wherein the storage controller causes the storage unit to store an image of a smile area recognized by the recognition unit,
   wherein the image capture controller causes the image capture unit to repeat image capturing until images of smile areas corresponding to all of the second face area and the face area candidate area are stored in the storage unit, and
   wherein the editing unit composites images of smile areas stored in the storage unit into the second face area and the face area candidate.

(13) The information processing device according to any one of (1) to (12),
   wherein the recognition unit recognizes a smile area from the captured image, and
   wherein the display controller superimposes onto the display unit a display indicating, as a non-smile area, an area in the current captured image that is among the second face area and the face area candidate area, but is not included in a smile area recognized by the recognition unit from the current captured image.

(14) The information processing device according to any one of (2) to (6),
   wherein the editing unit composites, into the face area candidate area, an area corresponding to the face area candidate in a captured image that was captured by an image capture unit different from an image capture unit that captured the current captured image.

(15) A non-transitory computer-readable recording medium having a program recorded thereon for causing a computer to execute:
recognizing a face area from a captured image;
causing a storage unit to store face recognition information indicating a recognized face area; and
superimposing onto a display unit a display that indicates, as a face area candidate in a current captured image captured by an image capture unit according to an external instruction, an area that is among areas corresponding to a first face area indicated by face recognition information from another captured image stored in the storage unit, but is not included in a second face area recognized from the current captured image, distinguishably from a display indicating the second face area.

What is claimed is:

1. An information processing device comprising:
one or more processors configured to:
recognize a face area from a captured image;
store face recognition information indicating the recognized face area; and
superimpose onto a display unit a display indicating, as a face area candidate in a current captured image according to an external instruction, an area that is among areas corresponding to a first face area indicated by face recognition information from another captured image, but is not included in a second face area recognized from the current captured image, distinguishably from a display indicating the second face area; and
superimpose onto the display unit a display indicating the face area candidate in a case a difference between a time at which the current captured image was captured and a time at which the another captured image was captured is less than or equal to a first threshold value.

2. The information processing device according to claim 1, wherein the one or more processors are further configured to:
edit the face area candidate area.

3. The information processing device according to claim 2, wherein the one or more processors are further configured to:
store the captured image, and
composite, into the face area candidate area, an area corresponding to the face area candidate in a captured image that was captured and stored before the current captured image is captured.

4. The information processing device according to claim 2, wherein the one or more processors are further configured to:
store the captured image, and
composite, into the face area candidate area, an area corresponding to the face area candidate in a captured image that was captured and stored after the current captured image was captured.

5. The information processing device according to claim 2, wherein the one or more processors are further configured to:
superimpose a candidate image onto the display unit, and
composite the candidate image into the face area candidate area in the current captured image according to an external instruction.

6. The information processing device according to claim 2, wherein the one or more processors are further configured to:
edit an area corresponding to the first face area in the current captured image.

7. The information processing device according to claim 1, wherein the one or more processors are further configured to:
superimpose a display indicating the face area candidate onto a current captured image that is captured prior to the external instruction and displayed on the display unit in real-time.

8. The information processing device according to claim 1,
wherein the face recognition information from the other captured image is face recognition information from a captured image that was captured before the current captured image is captured.

9. The information processing device according to claim 1,
wherein the face recognition information from the other captured image is face recognition information from a captured image that was captured after the current captured image was captured.

10. The information processing device according to claim 1, wherein the one or more processors are further configured to:
superimpose onto the display unit a display indicating the face area candidate in a case a difference between a time at which the current captured image was captured and a time at which the another captured image was captured is less than or equal to a second threshold value, and the number of matches between the first face area and the second face area is greater than or equal to a third threshold value.

11. The information processing device according to claim 2, wherein the one or more processors are further configured to:
recognize a smile area from the captured image,
store an image of a recognized smile area,
repeat image capturing until images of smile areas corresponding to all of the second face area and the face area candidate area are stored, and
composite images of stored smile areas into the second face area and the face area candidate.

12. The information processing device according to claim 1, wherein the one or more processors are further configured to:
recognize a smile area from the captured image, and
superimpose onto the display unit a display indicating, as a non-smile area, an area in the current captured image that is among the second face area and the face area candidate area, but is not included in a recognized smile area from the current captured image.

13. A non-transitory computer-readable recording medium having a program recorded thereon for causing a computer to execute:
recognizing a face area from a captured image;
storing face recognition information indicating the recognized face area; and
superimposing onto a display unit a display that indicates, as a face area candidate in a current captured image captured according to an external instruction, an area that is among areas corresponding to a first face area indicated by face recognition information from another captured image, but is not included in a second face area recognized from the current captured image, distinguishably from a display indicating the second face area; and superimposing onto the display unit a display indicating the face area candidate in a case a difference between a time at which the current captured image was captured and a time at which the another captured image was captured is less than or equal to a first threshold value.

14. The information processing device according to claim 1, wherein the one or more processors are further configured to:
   composite, into the face area candidate area, an area corresponding to the face area candidate in the current captured image that was captured by another one or more processors,
   wherein the other one or more processors are different from the one or more processors that captured the current captured image.

* * * * *